United States Patent [19]
Jouin et al.

[11] Patent Number: 5,483,531
[45] Date of Patent: Jan. 9, 1996

[54] DIGITAL MOBILE RADIO NETWORK STATION WITH SPEECH SIGNAL EXCHANGE MEANS AND DATA SIGNAL EXCHANGE MEANS

[75] Inventors: Christophe Jouin; Francis Pinault, both of Bois Colombes; Richard Grebot, Paris, all of France

[73] Assignee: Alcatel Radiotelephone, Paris, France

[21] Appl. No.: 220,022

[22] Filed: Mar. 30, 1994

[30] Foreign Application Priority Data

Mar. 31, 1993 [FR] France .................................. 93 03765

[51] Int. Cl.$^6$ ............................ H04J 3/12; H04L 12/26; H04B 1/38
[52] U.S. Cl. .................... 370/79; 370/110.1; 375/220; 379/63; 455/89
[58] Field of Search .................................. 370/58.1, 58.2, 370/58.3, 60, 60.1, 61, 68.1, 79, 84, 85.1, 85.6, 85.13, 85.14, 94.1, 94.2, 94.3, 110.1; 379/58, 59, 60, 63, 93, 94; 455/33.1, 33.2, 34.1, 34.2, 49.1, 53.1, 54.1, 55.1, 56.1, 67.1, 73, 89; 375/219, 220, 222

[56] References Cited

U.S. PATENT DOCUMENTS

| | | | |
|---|---|---|---|
| 5,012,470 | 4/1991 | Shobu et al. | 370/110.1 |
| 5,134,611 | 7/1992 | Steinka et al. | 370/79 |
| 5,182,748 | 1/1993 | Sakata et al. | 370/79 |
| 5,257,397 | 10/1993 | Barzegar et al. | 455/33.1 |
| 5,315,595 | 5/1994 | Allouis et al. | 370/110.1 |
| 5,335,225 | 8/1994 | Brax | 370/110.1 |

FOREIGN PATENT DOCUMENTS

| | | |
|---|---|---|
| 2259431 | 3/1993 | United Kingdom . |
| WO9118483 | 11/1991 | WIPO . |
| WO9222976 | 12/1992 | WIPO . |

OTHER PUBLICATIONS

French Search Report FR 9303765.

*Primary Examiner*—Alpus Hsu
*Attorney, Agent, or Firm*—Sughrue, Mion, Zinn, Macpeak & Seas

[57] ABSTRACT

A mobile station of a mobile radio network includes speech exchange arrangements and data exchange arrangements. Selector arrangements select the speech exchange arrangements by default and change to the data exchange arrangements when necessary. The data exchange arrangements comprise a set of components for sorting, analyzing and processing the data and the commands exchanged between two terminal equipments so that a mobile terminal equipment capable of exchanging data according to a first standard (the V.24 standard+modem protocol, for example) can communicate with another, remote terminal equipment via a digital network using a second standard (V.110+GSM network, for example).

12 Claims, 3 Drawing Sheets

DIGITAL MOBILE RADIO NETWORK STATION WITH SPEECH SIGNAL EXCHANGE MEANS AND DATA SIGNAL EXCHANGE MEANS

BACKGROUND OF THE INVENTION

1. Field of the Invention

The field of the invention is that of digital mobile radio. To be more precise, the invention concerns the exchange of digital data by means of a mobile radio system to enable communications between two data terminal equipments (DTE), for example, at least one of which is mobile.

2. Description of the Prior Art

In known means of communication between two DTE using a wired line (such as the public switched telephone network) each DTE cooperates with an asynchronous modem, usually one conforming to the V.24 standard and to a modem protocol (such as the "Hayes" protocol (registered trademark), for example). These standards define an interface between a DTE and a data communication-terminating equipment (DCE) or modem.

Known digital mobile radio systems include the European GSM (Global System for Mobile communications) cellular system. Cellular mobile radio systems divide a geographical territory into small portions or cells each served by one or more base stations. This subdivision into cells enables optimum use of the radio frequency spectrum as more than one cell can use the same portion of the spectrum.

On the other hand, the cellular approach gives rise to various problems concerning call management, especially when a mobile changes cell ("handover"). There are further specific constraints in the case of the GSM system such as frequency redefinition, the use of frequency hopping, etc.

Another standard, the V.110 standard, has been drawn up for connecting a DTE to an integrated services digital network (ISDN). This standard has been adapted to the specific features of the GSM system. Accordingly, a DCE can communicate via the GSM system.

However, conventional portable DTE (microcomputers, etc.) are not equipped to communicate to the V.110 standard, but only via modems. It is not possible to connect such DTE to a cellular mobile radio network.

Also, the use of a cellular network is usually associated with the concept of mobility, and consequently with limitations as to the size of and connections between units. Consequently, the use of a dedicated adapter device is not an acceptable solution.

An object of the invention is to offer a solution to these problems. To be more precise, an object of the invention is to provide means enabling easy connecting of a conventional DTE to a cellular network.

Another object of the invention is to provide such means able to receive data signals and speech signals alternately.

SUMMARY OF THE INVENTION

The present invention consists in a station of a digital mobile radio network for exchanging speech signals and data signals comprising:

connection means to a first data processing terminal equipment for bidirectional exchange of data to a first data exchange standard using a single transfer channel carrying data and commands simultaneously, first means for sending data to and receiving data from a second data processing terminal equipment via said mobile radio network according to a second data exchange standard using a data transfer channel and a command transfer channel, second means for sending speech signals to and receiving speech signals from a remote terminal via said mobile radio network according to a third data exchange standard, and means for monitoring a bidirectional call between said station and remote station comprising:

means for selecting either said first or said second transmitting and receiving means according to whether said call carries data or a speech signal, interface means between said first and second data exchange standards comprising:
  * in the direction from the first standard to the second standard:

means for separating data and commands delivered by said first terminal equipment, first transcoding means for transcoding said data delivered by said separator means from said first standard to said second standard and delivering data to be transmitted on said data transfer channel, first sorting means for sorting said commands into two sets of commands, a first set of commands to be transmitted to said second terminal equipment and a second set of commands to be executed by said station, means for interpreting commands of said second set of commands and delivering a second set of interpreted commands, first mapping means for mapping commands of said first set of commands and delivering commands to be transmitted on said command transfer channel,
  * in the direction from the second standard towards the first standard:

second sorting means for sorting commands received on said command transfer channel and delivering a third set of commands to be transmitted to said first terminal equipment and a fourth set of commands to be executed by said station:

second mapping means for mapping commands of said third set of commands and delivering commands to be transmitted to said first terminal equipment second transcoding means for transcoding data received on said data transfer channel from said second standard to said first standard and delivering data to be transmitted to said first terminal equipment, means for grouping said commands and said data to be transmitted to said first terminal equipment in order to transmit them over said single transfer channel, and
  * means for supervising said call from said second set of interpreted commands and said fourth set of commands and handling initialization, monitoring and interruption of said call.

The station of the invention can therefore be used to exchange data and to exchange speech alternately. The exchanges of data are managed by the station, without any additional external equipment.

Said supervisor means advantageously generate commands to be transmitted on said single transfer channel and/or said command transfer channel according to said second set of interpreted commands, said fourth set of commands and external information.

Said selector means preferably select said second speech signal transmit and receive means by default and said first data transmit and receive means are selected on reception of a call request sent by said first or said second terminal equipment.

Said selector means optionally send a specific instruction to enable/disable certain modules of said station when said first data transmit and receive means are selected.

In one advantageous embodiment of the invention:
said first data standard is the V.24 standard associated with a modem protocol;
said second data standard is the V.110 standard;
said digital mobile radio network is a GSM network.

Said station advantageously comprises means for selecting between at least two different data bit rates for exchanges of data to said first data standard.

In this case, it can also comprise means for adapting the format of the data exchanged according to said second data standard depending on said bit rate selected.

In one advantageous embodiment of the invention the station comprises means for controlling the flows sent and/or received by said station.

Said first sorting means preferably deliver a fifth set of commands for configuring said station to suite the requirements of said first equipment.

Other features and advantages of the invention emerge from the following description of one preferred embodiment of the invention given by way of non-limiting illustrative example and from the appended drawings.

DETAILED DESCRIPTION OF THE PREFERRED EMBODIMENT

Figure 1:
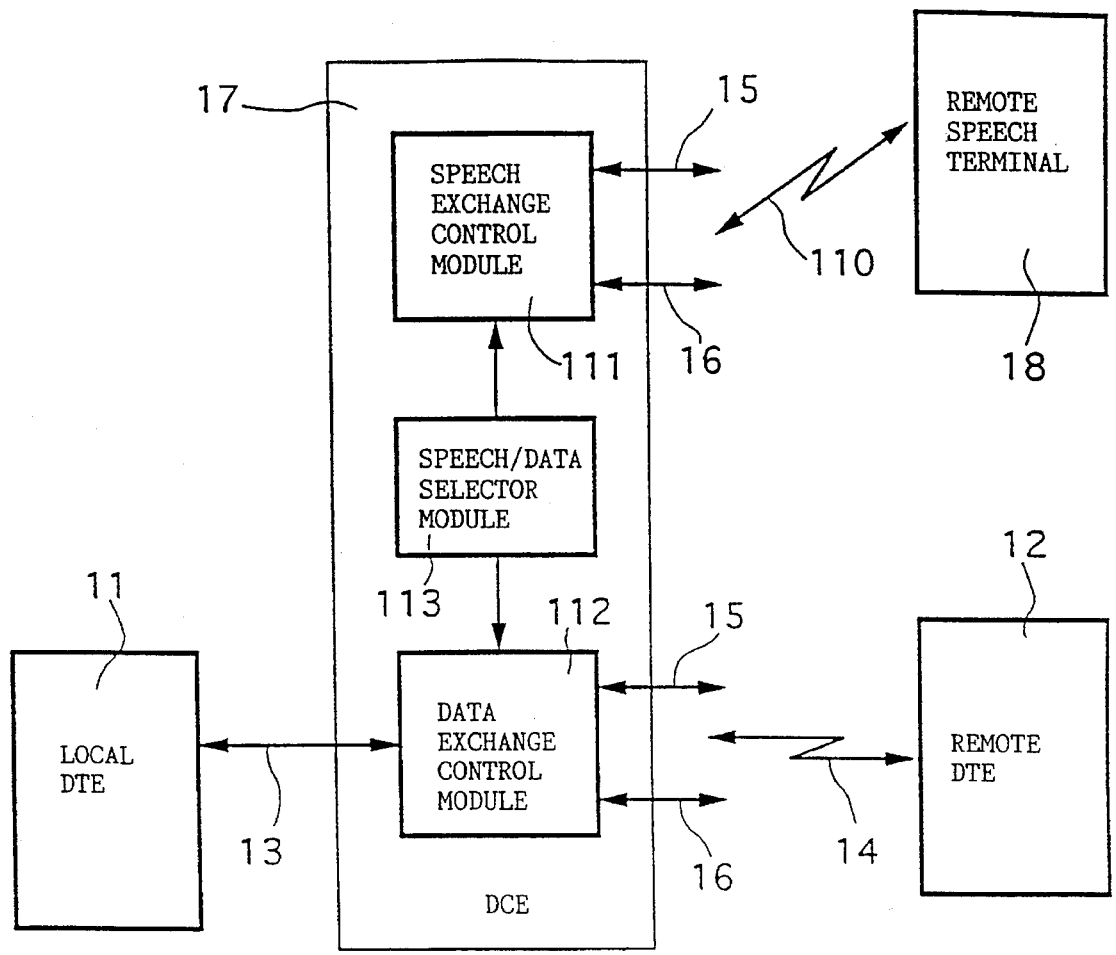
FIG. 1 is a diagram showing the general principle of the invention, including a mobile station able to communicate in data mode and in speech mode.

The preferred embodiment described below is intended to interconnect two DTE 11 and 12 (microcomputers, relay stations, etc., for example) at least one of which (11) is mobile and able to exchange data (13) in conformance with the V.24 standard (also known as the RS232 standard) and a modem protocol (or, more generally, to any standard for exchange of data using a single transfer channel conveying data and commands).

The mobile DTE 11 communicates (14) with the other DTE 12 (the remote DTE, which can also be mobile) via the GSM mobile radio network, which provides two separate channels:
a data transfer channel 15;
a command transfer channel 16.

The mobile station (or DCE) 17 according to the invention provides:
on the one hand, and conventionally, exchange of speech 110 with a remote speech terminal 18 using a speech exchange control module 111, and
on the other hand, exchanges of data between two DTE using a data exchange control module 112 providing the interface means between the DTE 11 and the GSM network (i.e. fulfilling the modem function). Most DTE are provided with V.24 communication means. Accordingly, in accordance with the invention ,the digital mobile radio network is transparent to the DTE and there is no need to provide it with an adapter.

A selector module 113, functioning as a selecting means, selects one of the two exchange modules 111 and 112. The speech exchange module 111 is selected by default. The data exchange module 112 is selected on reception of a connection request from one of the two DTE 11 and 12.

The mobile station 17 in accordance with the invention therefore has two essential features, namely:
the facility to select speech mode or data mode; thus the same equipment, of compact size, can provide both these functions in a manner that is virtually transparent for the user; the reduction in size and the absence of external interface means, and therefore of numerous connections, is essential in the context of a mobile application;
interfacing two totally different standards, requiring among other things a specific analysis of each command (including distinguishing between commands relating to the dialogue between the two DTE and those concerning communication at the GSM level).

Thus, selecting means 113 and interface means 112 define a means for monitoring a bidirectional call between a mobile station and a remote station, which embodies these two essential features.

Figure 2:
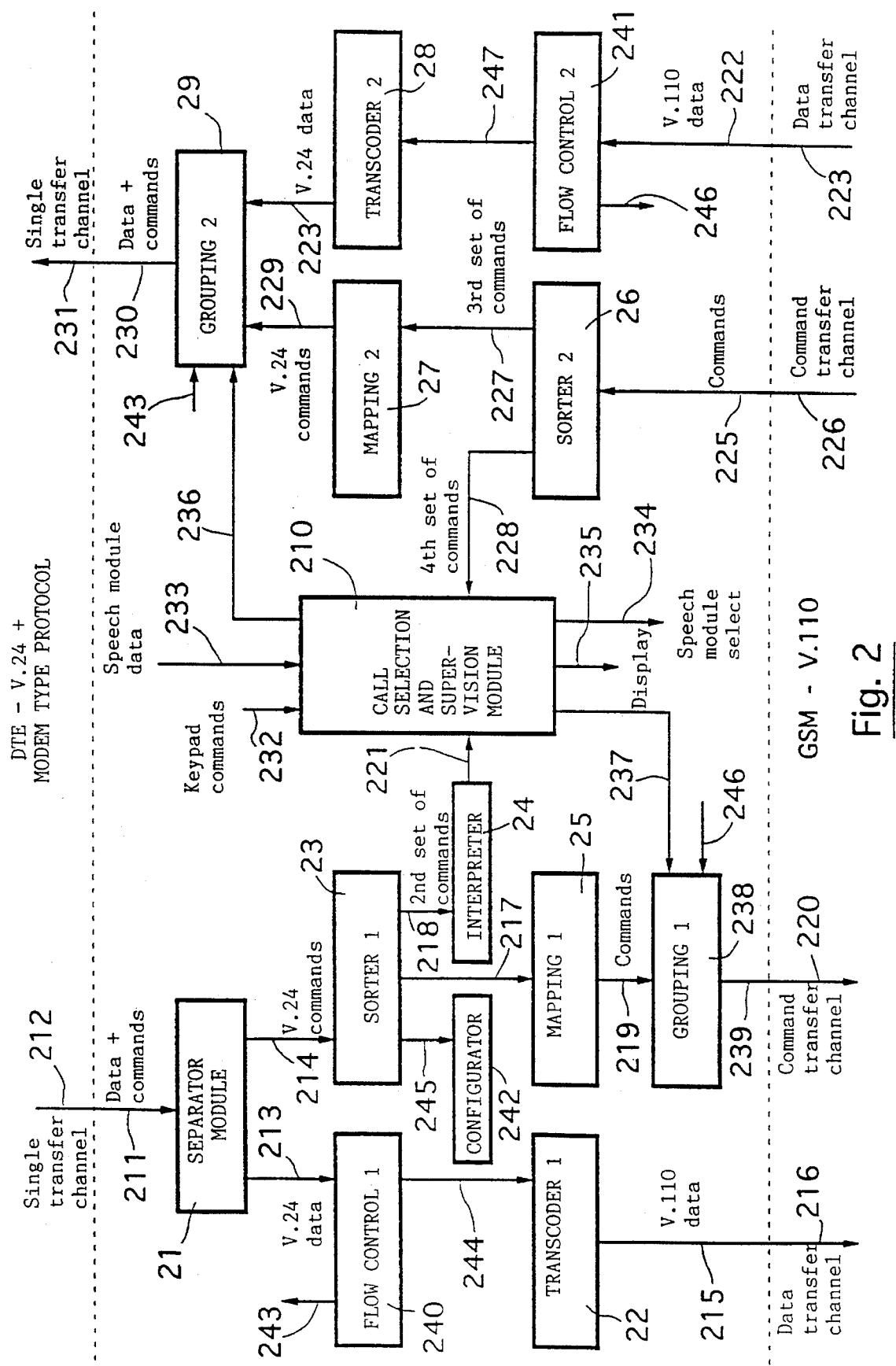
FIG. 2 is a functional block diagram of the interface means (112) of the station from FIG. 1.

FIG. 2 shows in more detail the interface in accordance with the invention implemented in the module 112 from FIG. 1.

The data and commands 211 received from the local DTE on a single transfer channel 212 (V.24 standard+modem protocol (registered trademark), for example)) are directed to a separator module 21 which delivers V.24+modem protocol data 213 and V.24+modem protocol commands 214.

The data 213 is passed to a first flow control module 240 which ensures that the data 213 is not delivered at a rate higher than that which the station can accept (to prevent the risk of congestion if the DTE transmits at too high a rate).

If the timing rate is too high an indication of this (243) is sent to the DTE. Otherwise the data is transmitted (244) to a transcoder module 22 which converts the V.24+modem protocol data into date 215 to the V.110 format (including grouping of the data into frames). The data 215 is then transmitted to the remote DTE via the data transfer channel 216 of the GSM network.

The commands 214 are processed by a first sorter module 23 which distinguishes between three sets of commands:
a first set of commands 217 which comprises commands addressed to the remote DCE (a repeat request, for example),
a second set of commands 218 comprising commands addressed to a call supervision module 210 (an interrupt call command, for example), and
a fifth set of commands 245 (the third and fourth sets are defined below) addressed to a configurator module 242 which configures the station according to the nature of the DTE.

Of course, some commands may be included in the two sets of commands 217 and 218.

The first set of commands 217 undergoes mapping 25 to adapt the format of the commands 217 (V.24+modem protocol) into a format 219 compatible with the GSM command transfer channel 220. The second set of commands 218 is interpreted by an interpreter module 24 which delivers to the supervisor module 210 commands 221 that it can interpret.

The procedure is substantially symmetrical in the other call direction.

The V.110 format data 222 received on the data transfer channel 223 is transmitted to a second flow control module 241 which ensures that the data 222 is not delivered at a rate greater than that which the station can accept.

If the timing rate is too high an indication 246 is sent on the command transfer channel. Otherwise the data (247) undergoes transcoding 28 to produce data 224 to the V.24+ modem protocol format. The commands 225 received on the command transfer channel 226 are subjected to sorting 26 to distinguish between:

a third set of commands 227 addressed to the local DTE, and a fourth set of commands 228 addressed to the supervisor module 210.

Once again, some commands can be included in both sets of commands.

The set of commands 227 is delivered to a mapping module 27 which produces corresponding commands 229 to the V.24+modem protocol format. The set of commands 228 is delivered direct to the supervisor module.

The data 223 and commands 229 to the V.24+modem protocol format are grouped (29) to form a set 230 of data and commands delivered on the single transfer channel 231 to the DTE. The grouping module 29 also receives the commands 243 sent by the first flow control module 240.

The supervisor module monitors the call at the GSM level. It handles the start, control and end of calls, including conventional GSM operations including handover, frequency redefinition, etc.

In addition to the commands 221 and 228 it can act on external commands such as those 232 from the keypad of the station. It can also receive information 233 from the speech exchange module 111 (FIG. 1), in order to deal with conflicts between two speech and data connection requests, for example. It can also implement the function of the selector module 113 by issuing a command 234 to enable/disable the speech exchange module (and possibly specific commands, for example to disable the keypad during exchange of data).

The supervisor module can also send messages 235 to a display for monitoring of the call in progress.

Finally, the supervisor module can itself generate commands to one or other of the DTE, when necessary:

commands 236 addressed to the local DTE are transmitted to the grouping module 29;

commands 237 addressed to the remote DTE or to the GSM network are transmitted to a second grouping module 238 which delivers commands 239 to the command transfer channel 220.

The second grouping module 238 also receives the command 246 sent by the second flow control module 241.

Figure 3:
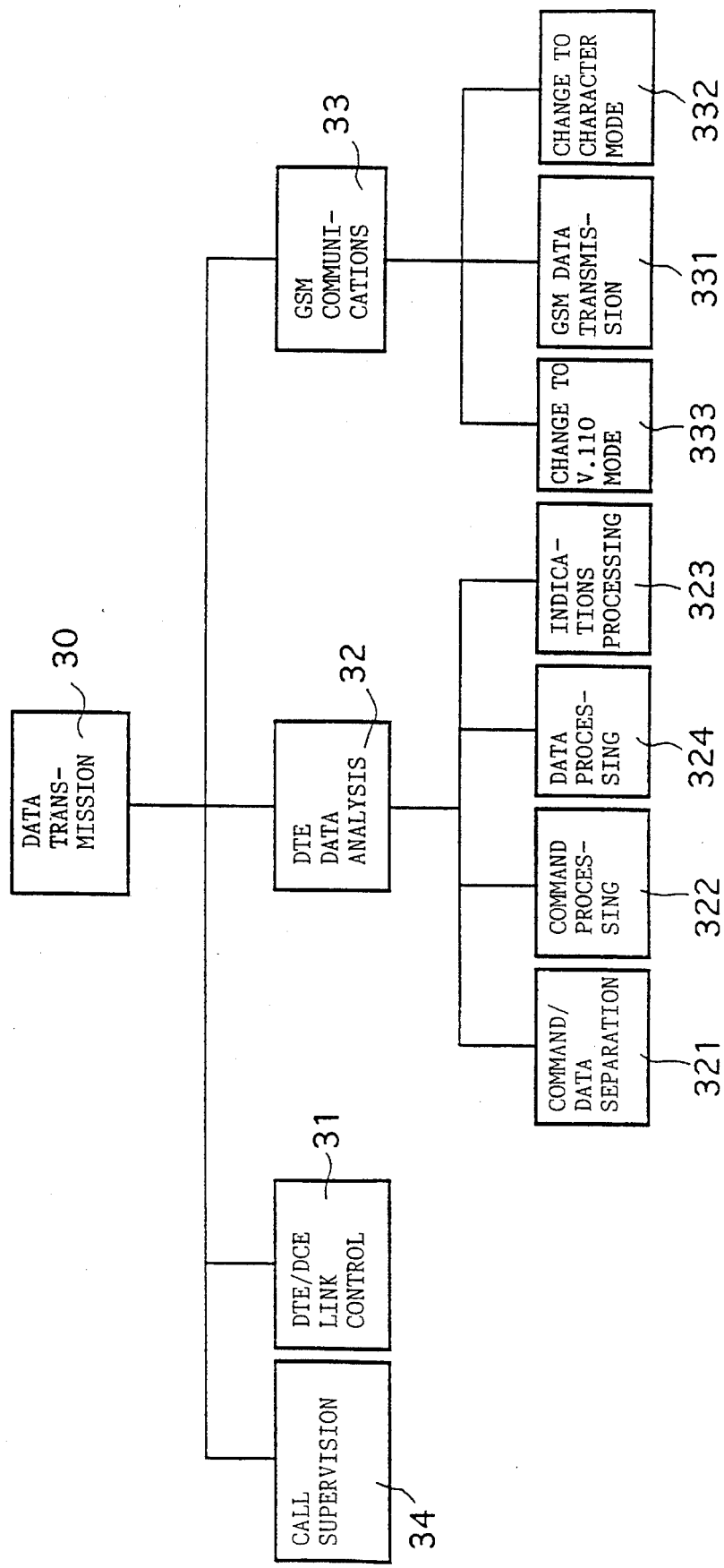
FIG. 3 is a functional block diagram showing the structure of the program controlling the interface means from FIG. 1.

These various resources can be grouped together in the mobile station in the form of software. FIG. 3 is a functional block diagram showing the structure of a program controlling these interface means.

The basic "data transmit" function 30 can be broken down into four main (level 0) functions:

1) DTE-DCE link control (31),

2) DTE-DCE data flow analysis (32),

3) GSM communications (33), 4) call supervision (34).

These functions break down as follows:

1) DTE-DCE link control (31)

This DTE-DCE link is of the standard RS232C type.

2. DTE-DCE data flow analysis (32)

2.1 "Command/data separation" function (321).

This function redirects data from the DTE/DCE LINK CONTROL function (31) to the terminal function COMMAND PROCESSING (322) or DATA PROCESSING (324).

The separation of command and data is effected in one of two mutually exclusive modes:

Command mode:

Characters from the DTE/DCE LINK CONTROL function (31) are stored one by one in a command string until the string can be interpreted, causing a change to data mode.

Data mode:

Characters from the DTE/DCE LINK CONTROL function (31) are stored one by one in a data string until the string can be interpreted, causing a change to command mode.

The change from command mode to data mode is defined so that:

Command mode is the default mode on initializing a data call.

In the case of a call initialized by the DTE, the change to data mode occurs on interpreting a specific command.

In the case of a call initialized by the mobile, the "call request" is sent to the supervisor layer after a specified number of rings.

The return to command mode is effected on three consecutive receptions of the character defined in a register.

The return to command mode is automatic in the case of an "end of call indication" by the CALL SUPERVISION block (34).

2.2. "DTE command processing" (322).

This function interprets characters from the COMMANDS/DATA SEPARATION function (331).

The processing of commands uses four types of data:

Commands:

They pass from the DTE to the DCE either in the form of signals (so that 108/2 "terminal not ready" is considered to be a command) or in the form of interpretable characters. These characters constitute a subset of the standard modem commands.

Information:

Information passes from the DCE to the DTE either in the form of signals or in the form of characters bracketed by a string or specific codes.

Result indications:

These pass from the DCE to the DTE in the form of characters bracketed by a string or specific codes.

Echo:

This refers to the return of characters received in command mode.

The function is activated by the COMMAND/DATA SEPARATION function (321) which invokes it at each valid command line. The commands are then interpreted one by one. For each command the interpreter waits for an indication from the CALL SUPERVISION block (34), if necessary. Where appropriate, it sends to the DTE the information and/or result indications relating to the command interpreted. A command line executed correctly causes the "OK" indication to be sent to the DTE. If a command in the line cannot be interpreted or executed the remainder of the line is ignored and an "ERROR" indication is sent back.

The function is de-activated on changing to data mode after all of the current command line has been interpreted or on receipt of an "end of call indication".

2.3. "Indications processing" function (323)

This terminal function is part of the DTE DATA ANALYSIS block (32). It manages indications from the DATA PROCESSING function (324) (322) and the CALL SUPERVISION functional block (34) and propagates these indications to the COMMAND DATA SEPARATION function (321), COMMAND PROCESSING function (322), DATA PROCESSING function (324) and the DTE/DCE LINK CONTROL block (31).

The processing is specific to the following indications:

"Initialization request" from the CALL SUPERVISION block (34).

"Initialization" to the COMMAND/DATA SEPARATION function (321), COMMAND PROCESSING function (322), DATA PROCESSING function (324) and the DTE/DCE LINK CONTROL block (31).

"Connection indication" from DATA PROCESSING (324).

"Disconnection indication" from DATA PROCESSING (324).

"Disconnection confirmation" from DATA PROCESSING (324).

"Incoming call indication" from the CALL SUPERVISION block (34).

"Call set up indication" from the CALL SUPERVISION block (34).

"End of call indication" from the CALL SUPERVISION block (34).

2.4. "Data processing" function (324)

This function manages data at character level and manages control bits of V.110 frames to the DTE and to the GSM network.

It is used to manage the DCE-GSM data flow in the form of characters. The data flows are effective only in the nominal operating mode of the function.

DCE → GSM direction flow control:

The COMMAND PROCESSING function (322) sends a "Connection request" to request the change to the "Data transmission" phase.

The COMMAND PROCESSING function (322) sends a "Disconnection request" to request termination of data transmission.

GSM → DCE direction flow control:

The states of the received command bits are supplied by the CHANGE TO CHARACTER MODE function (332). The function filters out the time allowed for these control bits to stabilize.

The "Idle" phase is set during the initialization of the mobile.

The bit rate class used is supplied by the COMMAND PROCESSING function (322) during this phase. The asynchronous bit rates authorized are: 2 400 bit/s, 4 800 bit/s and 9 600 bit/s.

The character structure (start bit, number of data bits, parity bit, number of stop bits) is given by the COMMAND PROCESSING function (322).

Idle Phase:

The "Idle" phase is used to refuse transfer of data.

The function is in this phase either after an initialization process or after a disconnection phase following local or remote data transfer termination.

Connection Phase:

The function enters this operating phase on receipt of a "Connection request" from the COMMAND PROCESSING function (322).

The function requests the CHANGE TO V.110 MODE function (333) and the CHANGE TO CHARACTER MODE function (332) to go to their connection phase.

Data Transfer Phase:

This phase follows on either from a successful connection phase or from an interrupted V.110 disconnection phase.

Disconnection Phase:

The function enters this operating phase in various cases:

Network disconnection.

Local disconnection.

V.110 disconnection.

3. Communicating via GSM (33)

3.1. "GSM data transmission" function (331)

The GSM C1 software relevant to the "Data transmission" application is limited to three functions:

initialization of the GSM C1 in data communication mode, exchanges on the TCH/9600, TCH/4800 or TCH/2400 channel, exchanges on the trace channel.

These functions must be transparent for the other call mode applications.

Multiframe call mode (26 frames).

The GSM C1 call mode is established on allocation of a TCH channel by the network (Immediate assignment).

The "speech" or "data" call is known to the GSM C3. The latter must configure the change from the GSM C1 into the "data transmission" mode by means of a specific item of information.

Once established, speech transfer mode handles:

transmission of TCH/FS blocks transmission of a signaling burst every 26 frames (for call quality control), supervision of neighbouring cells during the idle frame (for the purposes of handover), transmission of FACCH blocks by stealing TCH frames, averaging of the receive signal level, management of frequency hopping, encryption of the call, monitoring of physical entities.

All GSM C1 functions are retained for the Telestation application of the invention, and the following are added to them:

transmission of TCH/9600 blocks transmission of TCH/4800 blocks, transmission of TCH/2400 blocks exchanges with the trace channel.

Blocks received on the radio channel must be transmitted on the trace channel synchronously and transparently for the C1, and vice verse.

The interfaces are:

TCH/9600 channel: 4 packets of 60 bits are transmitted together. 'TCH/4800 channel: 2 packets of 60 bits are transmitted together.

TCH/2400 channel: 2 packets of 36 bits are transmitted together.

The station also handles:

conservation of the existing code for all other call mode functions:
 * hopping,
 * handover,
 * frequency redefinition, etc.

differing management of the physical entities:

*EP4 (speech processing) is not used for data transmission,

*EP3 (data processing) must be connected via the trace channel for sending and receiving data of the Telestation application.

3.2. "Change to character mode" function (332)

This function changes the data flow from the GSM network to the Telestation from V.110 mode to character mode.

A V.110 frame contains:

either 36 bits in the case of an asynchronous bit rate of 2 400 bit/s, or 60 bits in the case of asynchronous bit rates of 4 800 bit/s and 9 600 bit/s, for which two classes of bit rates the frame structure is identical.

This function receives blocks whose size and structure depend on the current bit rate class.

Each block is broken down into consecutive V.110 frames as follows:

*asynchronous bit rate 2 400 bit/s: 72 bits, i.e. two V.110 frame of 36 bits,

*asynchronous bit rate 4 800 bit/s: 120 bits, i.e. two V.110 frames of 60 bits,

*asynchronous bit rate 9 600 bit/s: 240 bits, i.e. four V.110 frames of 60 bits.

During the "Data transfer" phase characters contained in all the V.110 frames must be extracted. Extraction is effected character by character, synchronizing on the start bits. The characters are stored in the "peeled" form (without their start and stop bits). If the last character of the block is incomplete (i.e. straddling this block and the next block) the received part must be memorized pending arrival of the next block to complete it.

3.3. "Change to V.110 mode" function (333)

This function changes the data flow from the Telestation to the GSM network from character mode to V.110 mode.

The structure (number and V.110 frame structure) of the blocks to be sent to the GSM DATA TRANSMISSION function (331) depends on the current bit rate class.

This function is used to recover the character mode data flow form the DATA PROCESSING function (324). This data is stored by the DATA PROCESSING function (324). This data is routed via the SPI link to the GSM DATA TRANSMISSION function (331) in the form of V.110 frames.

Recovery of the characters stored by the DATA PROCESSING function comprises the following operations:

The start bit and the stop bits are added to each recovered character, in conformance with the current character format for the V.110 frames;

These characters are placed consecutively (without stuffing bits) in V.110 frames constituting the block in course of preparation;

The total number of bits reserved for data in the blocks of V.110 frames depending on the current bit rate (2×24= 48 bits if this is 2 400 bit/s, 48 bits if this is 4 800 bit/s, 4×48=192 bits if this is 9 600 bit/s);

In the case of a DTE overspeed, it is possible to compensate up to 1% by eliminating at most one stop bit every eight characters;

If the number of characters stored by the DATA PROCESSING function is less than the capacity of the current series of frames the remaining data bits are stuffing bits.

The block of V.110 frames is then sent to the GSM DATA TRANSMISSION function.

4. "CALL SUPERVISION" (34)

As its name indicates, the object of this function is to supervise the call between the DTE connected to the mobile and a remote DTE. It consists in call set up, maintenance and clearing down, whether the call is incoming or outgoing.

This function adds to the standard software the functions for seizure and management of a data terminal in addition to the operating terminal.

Supervision of a data mode call is very similar to supervision of a speech mode call. It differs in terms of the function of each terminal.

In Speech Mode

Any request from the DTE is rejected.

In Data Mode

The call set-up and disconnection (Call Control) phases are identical to those for speech mode, as are S.I.M. management and Mobility Management.

* Outgoing Call:

The DTE submits a request accompanied by the number to be dialed, the call set-up phase (until the call is set up) is identical to that of a call in speech mode, the request is understood as a hands free call request in order to generate the tones in the external loudspeaker. The station therefore remains active and keystrokes are acted on.

* Incoming Call:

On receiving a data mode incoming call the DTE is advised and can accept the call or not. The call set-up phase (until the call is set up) is identical to that for a call in speech mode. The T.E. (station) therefore remains active and keystrokes are acted on.

Immediately the call is set up the T.E. becomes inactive and keystrokes are ignored.

Also, the CALL SUPERVISION function (34) must now accept transparent asynchronous data mode calls at 2 400 bit/s, 4 800 bit/s and 9 600 bit/s (incoming call accounting management).

* Outgoing Call:

On receipt of a "data mode call request" from the DTE, the CALL SUPERVISION function (34) submits a "network connection request" if the mobile is located and if an SIM is present.

The following conditions must be met first:

the party must be on-hook a channel must have been allocated for the call, the call is set up end-to-end.

The network or the DTE DATA ANALYSIS function (32) can submit an "end call request" at any time. Likewise removal of the SIM or pressing the "halt" key terminates the call.

If an incoming call request ("data mode call request" from the network) is received during setting up of an outgoing call the latter is aborted.

* Incoming Call.

On receipt of a "data mode call request" from the network the type of call requested is checked for compatibility with the type of call accepted by the mobile (asynchronous call in transparent mode at 2 400 bit/s, 4 800 bit/s or 9 600 bit/s).

When the call has been set up the T.E. displays a message indicating that the call has been set up in data mode and all keystrokes (except the "halt" key) are ignored. The audio circuits are turned off.

Following confirmation of disconnection from the network the keys are again enabled.

The software thus enables set-up, maintenance and clearing down of a call between two DTE at least one of which is connected to a GSM mobile used like a modem.

The call is in transparent asynchronous mode at 2 400 bit/s, 4 800 bit/s or 9 600 bit/s depending on the capability of the network.

Mobiles equipped with the software must be able to communicate in speech mode using a T.E. or in data mode exclusively in the presence of a connected DTE.

There is claimed:

1. Mobile station of a digital mobile radio network for exchanging speech signals and data signals comprising:

connection means to a first data processing terminal equipment for bidirectional exchange of data according to a first data exchange standard using a single transfer channel carrying data and commands simultaneously, first means for sending data to and receiving data from a second data processing terminal equipment via said mobile radio network according to a second data exchange standard using a data transfer channel and command transfer channel, second means for sending speech signals to and receiving speech signals from a remote terminal via said mobile radio network according to a third data exchange standard, and means for monitoring a bidirectional call between said mobile station and remote station;

wherein said monitoring means comprises:

means for selection either said first or said second sending and receiving means according to whether said call carries data or a speech signal, and interface means for converting data signals between said first and second data exchange standards;

wherein said interface, in the direction from the first standard towards the second standard, comprises:

means for separating data and commands delivered by said first terminal equipment, first transcoding means for transcoding said data delivered by said separating means from said first standard to said second standard and delivering data to be transmitted on said data transfer channel, first sorting means for sorting said commands into two sets of commands, a first set of commands to be transmitted to said second terminal equipment and a second set of commands to be executed by said mobile station, means for interpreting commands of said second set of commands and delivering a second set of interpreted commands, and first means for mapping commands of said first set of commands and delivering commands to be transmitted on said command transfer channel;

wherein said interface means, in the direction from the second standard towards the first standard, comprises:

second means for sorting command received on said command transfer channel and delivering a third set of commands to be transmitted to said first terminal equipment and a fourth set of commands to be executed by said mobile station, second means for mapping commands of said third set of commands and delivering commands to be transmitted to said first terminal equipment, second means for transcoding data received on said data transfer channel from said second standard to said first standard and delivering data to be transmitted to said first terminal equipment, and means for grouping said commands and said data to be transmitted to said first terminal equipment in order to transmit them over said single transfer channel; and wherein said interface means further comprises means for supervising said call from said second set of interpreted commands and a full set of commands and handling initialization, monitoring of said call.

2. Mobile station according to claim 1 wherein said supervising means generate command to be transmitted on said single transfer channel or said command transfer channel according to said second set of interpreted commands, said fourth set of commands and external information.

3. Mobile station according to claim 1 wherein said selecting means select by default said second speech signal sending and receiving means and said first data sending and receiving means are selected on reception of a call request sent by said first or said second terminal equipment.

4. Mobile station according to claim 1 wherein said selecting means send a specific instruction to enable/disable certain modules of said mobile station when said first data sending and receiving means are selected.

5. Mobile station according to claim 4 wherein said specific enabling/disabling instruction disables at least some keys of a keypad.

6. Mobile station according to claim 1 wherein said first data standard is the V.24 standard associated with a modem protocol.

7. Mobile station according to claim 1 wherein said second data standard is the V.110 standard.

8. Mobile station according to claim 1 wherein said digital mobile radio network is a GSM network.

9. Mobile station according to claim 1 comprising means for selecting between at least two different data bit rates for exchanges of data to said first data standard.

10. Mobile station according to claim 9 comprising means for adapting the format of the date exchanged according to said second data standard depending on said bit rate selected.

11. Mobile station according to claim 1 comprising means for controlling the flows sent or received by said mobile station.

12. Mobile station according to claim 1 wherein said first sorting means deliver a fifth set of commands for configuring said mobile station to suit the requirements of said first terminal equipment.

* * * * *